E. J. MOLERA & J. C. CEBRIAN.
Carbon-Floats for Electric-Lamps.
No. 214,516. Patented April 22, 1879.
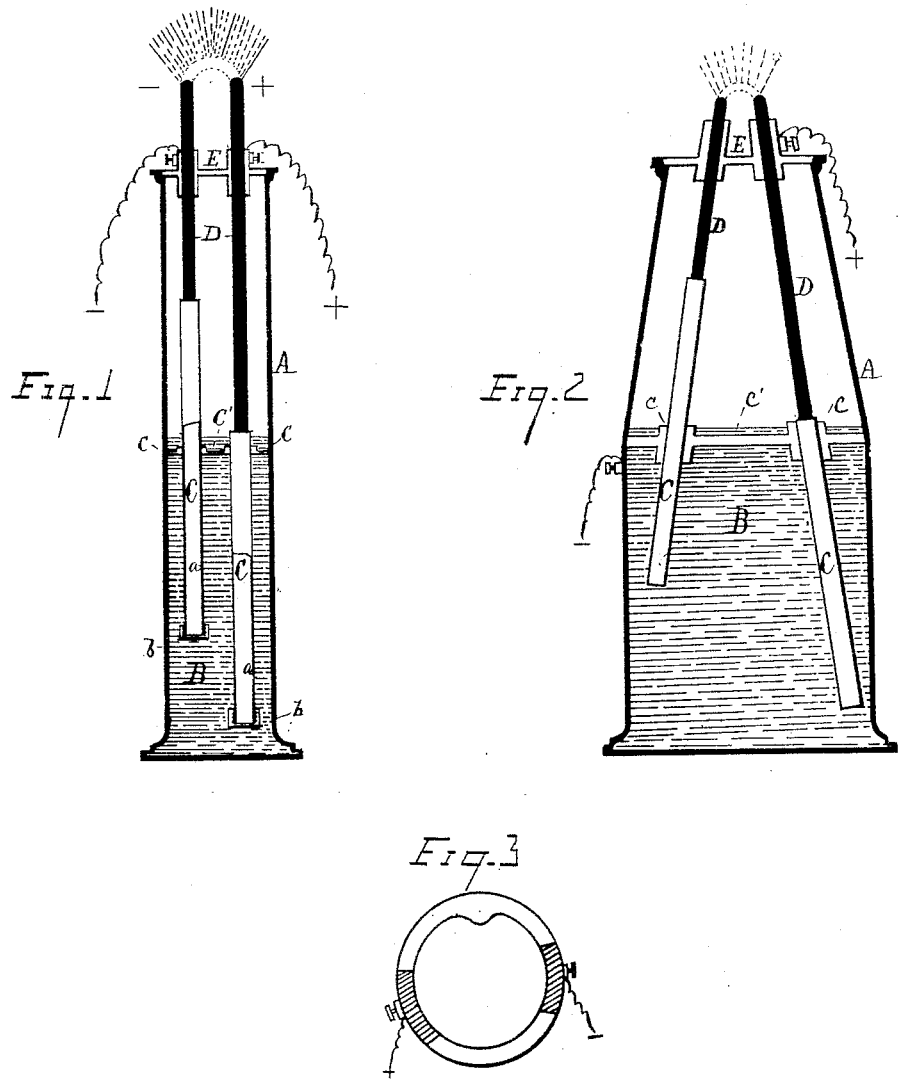

UNITED STATES PATENT OFFICE.

EUSEBIUS J. MOLERA, AND JOHN C. CEBRIAN, OF SAN FRANCISCO, CAL.

IMPROVEMENT IN CARBON FLOATS FOR ELECTRIC LAMPS.

Specification forming part of Letters Patent No. 214,516, dated April 22, 1879; application filed September 21, 1878.

*To all whom it may concern:*

Be it known that we, EUSEBIUS J. MOLERA and JOHN C. CEBRIAN, of San Francisco, in the county of San Francisco and State of California, have invented certain new and useful Improvements in Electric-Light Regulators; and we do hereby declare the following to be a full, clear, and exact description of the invention, such as will enable others skilled in the art to which it pertains to make and use it, reference being had to the accompanying drawings, which form part of this specification.

Our invention relates to electric-light regulators, and is designed to provide improved means whereby carbon candles, or any other kind of electric candles, may be automatically adjusted, so as to maintain their burning-points constantly in the same position.

Referring to the drawings, Figure 1 is a vertical sectional view representing our invention. Fig. 2 is a similar view representing a modification of the same, with the electric candles inclined instead of straight.

A hollow stand, A, is suitably filled with a liquid, B, in which the two independent floats, C, are immersed to a greater or less extent. These floats, respectively, support the two candles D, which may be secured thereto in any desired manner, and which may be carbons, or any other substance proper to be used in electric light. These floats are formed of suitable material, and have weight and size such that any certain portion of their lengths will displace a volume of liquid whose weight is the same as the weight of an equal length of the carbons or candles.

The floats pass, respectively, through guides c, in which they have free movement upward and downward, said guides being preferably secured to or formed in same piece with a diaphragm, c', which latter is fitted in the hollow stand at any suitable point.

The carbons or candles pass, respectively, through guides E, and have free upward and downward movement therein, so that without limiting said movement in either direction the guides yet maintain said carbons in proper position. This position may be either vertical, as in Fig. 1, or inclined, as shown in Fig. 2, in which latter case the guides must be properly inclined and adjusted.

Simultaneously with the consumption of the carbon or candle points, the floats will raise the carbons a distance equal to the lengths of same, respectively, consumed, and the carbon or candle points will be maintained constantly in the same horizontal plane. In this manner the carbons or candles are maintained in position with an unvarying pressure, and there is no tendency on their part, when of full length, to pass beyond the proper burning-point. They are unrestricted in their upward and downward movement, and accurately adjust the carbon points in position. This follows of necessity, from the fact that the difference between the volumes of liquid displaced by a float, respectively, before and after the consumption of any certain length of its carbon or candle, is of a weight the same as is the weight of the length of the carbon or candle which was consumed.

The carbons or candles used in our regulator may be a single one, as a Jablochkoff candle, for instance; or they may be two or more, placed side by side vertically and parallel; or, finally, they may be arranged in any other suitable manner having the principle of this invention incorporated therein.

The candle and float-guides may be of any description whatever, provided only that they properly guide the substances to be burned. They may be connected to the stand in any wise, and by their relative arrangement and shape we may give to the electric carbons or candles any inclination.

In all cases the positive and negative wires from the electric machine may be connected to the carbons or candles either at their guides, as in Fig. 1, for instance, or one at one of said guides and the other at any point of the stand, or the liquid, as in Fig. 2, for instance.

If the wires are connected at said guides, the collars whereon the carbons or candles slide must be good electric conductors and isolated in any proper way. The floats must be also non-conductors, or must be coated with non-conducting material, so as not to establish an electric communication through said floats and liquid. In case that one of the wires be connected to the stand itself, as in Fig. 2, then one of the floats, the stand, and the liquid must all be good conductors of electricity, and the other float must be a non-conductor. If the stand be a non-conductor the wire must be connected to the liquid itself. In the cases that the liquid must be a good conductor of electricity, we may use any substance dissolved in it that may increase its conductibility.

As to the way to make the connections of the wires, we may employ any form of buttons, keys, &c., usually employed, or any other proper way of fastening.

In case of using a single candle, as a Jablochkoff candle, for instance, we may use as a guide a perfectly isolated collar, on the interior of which the two points of wire abut or terminate, so that each wire is in constant contact with each one of the carbons embedded in the candle; or else we may use as a guide a collar like that of Fig. 3, in which the shaded parts represent good conducting materials, and the rest is made of non-conducting material, the wires being connected to the good conducting portions of it.

It remains only to say how to avoid the inconvenience arising from the varying densities of the liquids which may be used, and of the carbons or candles used. The inconvenience is, that with different densities and using always the same floats, the points of the carbons or candles will be at different heights. In order to be able always to keep them at the same height, we form the floats with openings or tubular formations $a$, and provide screw-caps $b$ at their lower extremities, whereby said tubular floats may be filled to any desired extent with weighted matter. Instead of these detachable caps, any other suitable mechanism or device may be employed for accomplishing the same purpose. Thus we may fill said hollow floats with solid or liquid materials, more or less, so as to regulate always at the start the height of the points to be burned. We may also have those floats made (solid or hollow) in two or more lengths, that may be put together and taken apart, so as to vary also their lengths and weights according to the different densities or weights of the candles or carbons and the liquids which are used.

Having fully described our invention, what we claim as new, and desire to secure by Letters Patent, is—

1. In an electric-light regulator, the combination, with an electric candle, of a float-stem secured directly to the lower end thereof, and formed as a tube having a closed top and an open bottom provided with a detachable cap, the same being adapted to permit either liquid or solid matter to be introduced within said stem, substantially as set forth.

2. In an electric-light regulator, the combination, with a fixed plate formed with two vertical or vertically-inclined guides, and located within a hollow stand suitably filled with liquid, of floats having free longitudinal movement, respectively, within said guides, and whose upper extremities are secured to the electric candles, together with guides formed in the top of the stand and made vertical or vertically-inclined correspondingly with the plate-guides, said top guides being adapted to permit the burning extremities of the electric candles to have unrestrained endwise movement therein, substantially as set forth.

3. In an electric-light regulator, the combination, with a horizontal plate fixed transversely in a hollow stand and immersed within the liquid with which the latter is suitably filled, said plate being formed with vertical or vertically-inclined guides, within which the candle-floats have free endwise movement, of the guides formed in the top of the stand, and made correspondingly vertical or vertically-inclined, whereby the burning extremities of the electric candles whose opposite ends are secured, respectively, to said floats, may have unrestrained longitudinal movement within the same, substantially as set forth.

In testimony that we claim the foregoing we have hereunto set our hands this 7th day of September, 1878.

EUSEBIUS J. MOLERA.
   JOHN C. CEBRIAN.

Witnesses:
 F. O. WEGENER,
 J. M. SHUMAKER.